INVENTOR.
ROBERT W. TAUBER,
BY E. A. Osm.
AGENT.

Feb. 26, 1957 R. W. TAUBER 2,783,429

REMOTE POSITION CONTROL SYSTEM

Filed Nov. 30, 1954 2 Sheets-Sheet 2

INVENTOR:
ROBERT W. TAUBER,
BY E. A. Osm.
AGENT.

United States Patent Office 2,783,429

Patented Feb. 26, 1957

2,783,429

REMOTE POSITION CONTROL SYSTEM

Robert W. Tauber, Los Angeles, Calif.

Application November 30, 1954, Serial No. 472,064

11 Claims. (Cl. 318—467)

Figures 1, 3:
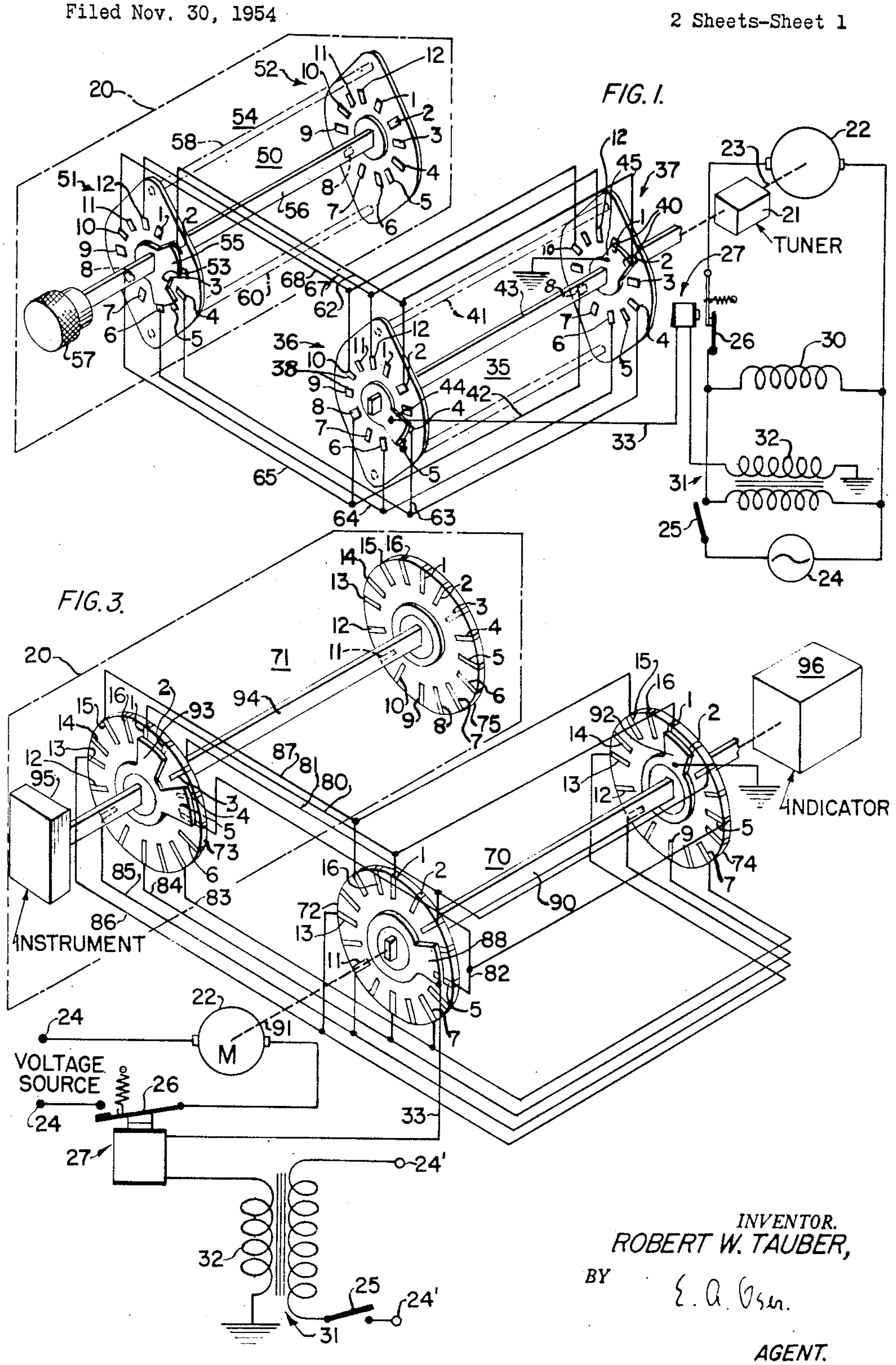

This invention relates generally to remote control systems, and more particularly relates to an electric circuit including a pair of switches for positioning a remotely located device in accordance with the position of a control device.

The electric control circuit of the present invention is particularly adapted for remotely controlling the tuning of a television receiver or the like. However, it will be understood that the control circuit of the invention may be utilized for providing a remote indication of the position of an instrument and for other remote positioning.

Remote control circuits of this type are generally known. For example, it has been proposed to control the tuner of a television receiver from a remote location by energizing an electric motor until a switch controlling the electric motor and mechanically connected thereto has the same position as a switch at the remote location. In this manner the tuner may be positioned into as many angular positions as the switch has contacts. The drawback of this prior art circuit is the fact that it is necessary to connect each contact of the switch at the remote location to each corresponding contact of the switch connected to the tuner. As soon as the number of contacts of the two switches exceeds a very small number, the number of conductors or wires becomes excessive requiring a heavy cable to connect the remote control device with the television set. For other applications such as a remote indicator for an instrument the number of wires soon becomes so large that the control circuit is no longer economically feasible and other types of remote control systems must be used. Some of these control systems require special synchronously operated stepping motors which are expensive to manufacture.

It is, accordingly, an object of the present invention to provide a novel remote control system which permits positioning of a device from a remote location.

Another object of the invention is to provide an electric control circuit including a pair of switches, one being associated with a remote device to be controlled and the other one with a control device, the switches being interconnected with a minimum number of wires.

A further object of the invention is to provide an electric control circuit of the type referred to which is economical and reliable and which may readily be modified to provide any number of desired positions of the device to be controlled without requiring an excessive number of wires between the two devices to be positioned.

In accordance with the present invention there is provided a control system for positioning a remote device such as the tuner of a television receiver in accordance with the position of a control device such as a control box located remote from the television set. The control system includes an electric motor coupled to the tuner of the television receiver for rotating it to a desired position corresponding to the selected channel. A first switch which may, for example, be a conventional wafer switch is directly connected to the control device and has a predeterimned number of contacts which equals the number of positions of the tuner. A second switch identical to the first switch is coupled to the tuner and its motor so that the tuner and the second switch are rotated in unison by the motor. The second switch has a number of contacts equal to that of the first switch.

Alternate contacts such as all even contacts on the two switches are interconnected by conductors. Each of the switches has at least one contact arm rotatable with respect to the switch contacts, and each contact arm makes electrical contact with at least two adjacent switch contacts. The electric motor is energized by a circuit which includes a battery or other source of electric energy and the contact arms of the second switch. The connections are such that the motor is energized to rotate the tuner in response to rotation of the first switch until both switches have reached like positions at which time the motor is de-energized.

The motor may either be directly energized through the second switch or else the switch may control a relay which in turn connects or disconnects the electric motor to a voltage source.

Figure 2:
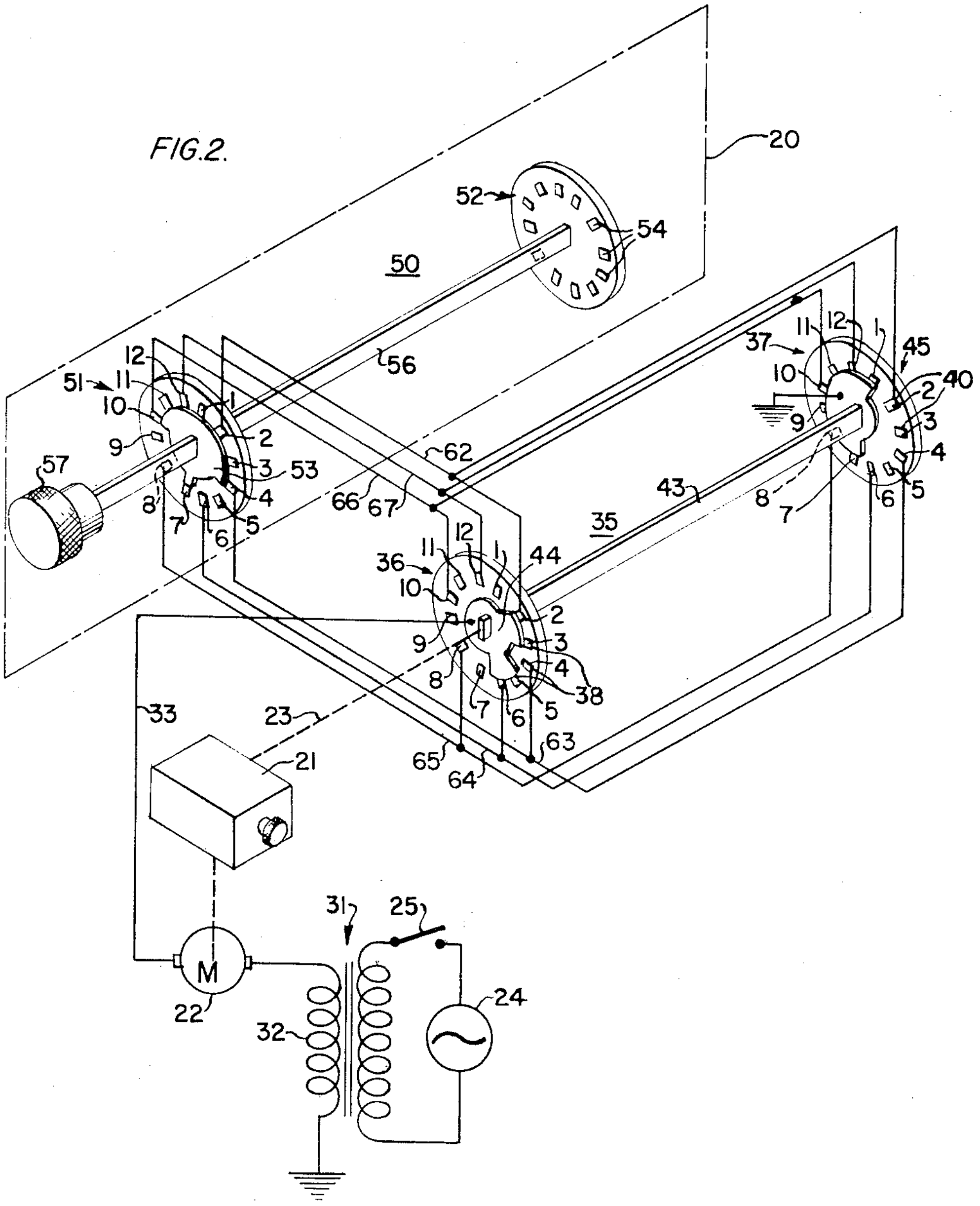

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 1 is an isometric view and schematic circuit diagram of the remote control system of the present invention arranged for controlling the tuner of a television receiver;

Fig. 2 is an isometric view and schematic circuit diagram of a modified remote control system in accordance with the invention also for controlling a television tuner, the motor being directly controlled by the switching arrangement; and Fig. 3 is an isometric view and schematic circuit diagram of a further modification of the invention for remotely indicating the position of an instrument and providing sixteen discrete positions of the indicator.

Referring now to the drawings, wherein like elements are designated by the same reference characters, and particularly to Fig. 1, there is illustrated a remote control system embodying the present invention. The system includes a control device indicated by dotted lines 20 and a device such as a tuner 21 of a television receiver to be controlled. An electric motor 22 is mechanically coupled as indicated by dotted line 23 to the tuner 21 for rotation thereof. The electric motor 22 is energized by a source of alternating voltage 24 indicated schematically having one terminal connected directly to the motor while its other terminal is connected to the motor through a main switch 25 and the normally closed contacts 26 of a relay 27.

The television set indicated schematically by inductor 30 may be connected across voltage source 24 through main switch 25 and may be energized when the switch is closed. The winding of relay 27 is energized by means of a transformer 31 having a primary winding connected across voltage source 24 through main switch 25. The secondary winding 32 of the transformer 31 has one terminal grounded while its other terminal is connected to the winding of relay 27. Hence it will be seen that closing of main switch 25 will energize transformer 31 which permits energization of relay 27 provided the lead 33 connected to the other terminal of the relay winding is grounded. Furthermore television set 30 is energized. Motor 22 will also be energized as long as relay switch 26 is closed.

In accordance with the present invention a wafer switch 35 is associated with motor 22 and tuner 21. The wafer switch 35 has a front portion 36 and a rear portion 37 insulated from each other, as is conventional. For clarity the front portion 36 and rear portion 37 of the wafer switch are shown spaced from each other; usually the side of rear portion 37 of the wafer switch illustrated in the drawings will be reversed, in other words, the sides of switch portions 36 and 37 will normally be disposed back to back. Each switch portion 36 and 37 may be provided with twelve contacts 38 and 40 as illustrated which are identified by numbers from 1 to 12 and which are disposed circumferentially about their switch portions. Corresponding even contacts such as contacts 2, 4 and so on are electrically connected by leads as shown. The two switch portions 36, 37 are mechanically fixed to each other as indicated by rods 41 and 42 and are stationary.

Fixed to a switch shaft 43 which, in turn, is connected to motor 22 and tuner 21 by shaft 23 are contact arms 44 and 45 cooperating with the contacts on switch portions 36 and 37, respectively. Contact arm 44 has a projection or pointer extending over two adjacent ones of its contacts, that is, contacts 4 and 5 in the position shown in Fig. 1. Contact arm 45 likewise has a projection extending over two of its associated contacts, that is, contacts 1 and 2 in the position of Fig. 1. Hence, it will be seen that contact 3 which is intermediate contacts 1, 2, and 4, 5 does not make contact with either contact arm.

A second wafer switch 50 forms part of the control device 20 and has generally the same construction as does wafer switch 35. Thus, wafer switch 50 consists of a front portion 51 and a rear portion 52, each of which may have twelve contacts 53 and 54 which are again marked by consecutive numbers. The rear switch portion 52 is actually unnecessary in the embodiment of the invention of Fig. 1 and may be omitted. A contact arm 55 is mounted on switch shaft 56 and cooperates with the contacts 53 of the front portion 51. The switch shaft 56 may be rotated in any manner, for example bv a knob 57. Contact arm 55 has two spaced projections, each extending over two switch contacts such as contacts 2, 3 and 5, 6 as shown in Fig. 1, the contact 4 being not in contact with the arm. The two switch portions 51 and 52 are again mechanically connected by rods 58 and 60 and are stationary with respect to switch shaft 56 and contact arm 55.

Lead 33 connects the winding of relay 27 to contact arm 44 of the switch portion 36. The other contact arm 45 of switch portion 37 is grounded as shown. The two wafer switches 35 and 50 are interconnected by leads 62, 63, 64, 65, 66 and 67 which connect the even contacts, that is contacts 2, 4, 6, 8, 10 and 12 of the two front portions 36 and 51 of the two wafer switches. It will be noted that in accordance with the invention it is not necessary to interconnect every contact of the front switch portions 36 and 51 nor is it necessary to connect every contact of the two portions of wafer switches 35 and 50 to each other but only every second contact. Hence, it will be obvious that, for example, the odd contacts may be omitted.

The operation of the remote control system of Fig. 1 will now be explained. At first the main switch 25 is closed. It may be pointed out that it may be convenient to locate main switch 25 at the location of control device 20 in which case the energization of the television set may be remotely controlled. By closing main switch 25 transformer 31 is energized as is television set 30 and motor 22. Relay 27 is de-energized because the circuit through the relay may be traced from ground to secondary winding 32, relay 27, lead 33, contact arm 44, lead 63 to contact 4 of switch portion 51. Since this contact 4 is not connected elsewhere, the relay circuit is open. The motor 22 will accordingly rotate tuner 21 and contact arms 44 and 45 in a clockwise direction, for example.

Let it now be assumed that the motor 22 rotates the switch contact arms 44 and 45 through an angle of 30° corresponding to a full revolution divided by twelve, the number of contacts of the wafer switches. Accordingly, contact arm 44 will now be in contact with contacts 5 and 6 on the front portion 36 while contact arm 45 makes contact with contacts 2 and 3 on the rear portion 37. An electric circuit can now be traced from lead 33, contact arm 44, lead 64, contact arm 55, lead 62 to contact 2 on front portion 36 which is connected to the same contact on the rear portion 37, and through contact arm 45 to ground. Therefore, the relay circuit is closed, and the energized relay will open relay contact 26 thus interrupting the power supply of motor 22. Further rotation of the motor ceases, and it will be seen that now both wafer switches 35 and 50 are in identical positions.

It can readily be shown that motor 22 is energized again, as soon as wafer switch 50 is further rotated by rotation of control knob 57. The motor will continue to rotate until the two wafer switches assume the same positions again. Let it be assumed that contact arm 55 as illustrated in Fig. 1 is in position 2, that is, the left hand corner of the projections of the contact arm 55 covers contact 2. With this definition the energizing circuit for relay 27 corresponding to opening of relay contacts 26 and de-energization of the motor may be traced for all twelve switch positions. Hence for switch positions 1, 2, 3, 4, 5, 6, 7, 8, 9, 10, 11 and 12 the relay circuit beginning with relay lead 33 is energized respectively through leads 63 and 62; 64 and 62; 64 and 63; 65 and 63; 65 and 64; 66 and 64; 66 and 65; 67 and 65; 67 and 66; 62 and 66; 62 and 67; and 63 and 67.

Consequently, by rotation of control knob 57, the tuner 21 may be rotated to any of twelve positions. The switching circuit only requires six wires, that is one wire for every two positions of the tuner or other device to be controlled.

In the circuit of Fig. 1 it is necessary to control the motor 22 by means of the relay 27. The simplified circuit of Fig. 2 permits control of the motor 22 directly without requiring a relay. To this end transformer 31 is a step-down transformer so that the voltage developed across the transformer secondary 32 is lower than that of voltage source 24. The television receiver could again be connected across voltage source 24 through main switch 25 as illustrated in Fig. 1. Motor 22 rotates tuner 21 and shaft 43 of wafer switch 35.

The two wafer switches 35 and 50 may have the same construction as those illustrated in Fig. 1. However, contact arm 44 of the front portion 36 of the wafer switch now includes two projections which make contact each with two switch contacts such as contacts 2, 3 and 5, 6 in such a manner that contact 4 is not electrically connected to the contact arm. The contact arm 45 of rear switch portion 37 has a projection which makes contact with seven of the switch contacts, the five remaining contacts being not in electrical contact with the contact arm 45. As shown in Fig. 2, contact arm 45 contacts switch contacts 7, 8, 9, 10, 11, 12 and 1.

The rear portion 52 of wafer switch again needs no contact arm and may therefore be omitted. The front switch portion 51 has a contact arm 53 provided with a single projection in electrical connection with one of the contacts, such as contact 7 as shown in Fig. 2. Two contacts such as contacts 6, 5 and 8, 9 on either end of the projection are electrically insulated from the contact arm. All remaining contacts, that is, contacts 9, 10, 11, 12, 1, 2, 3 and 4 are connected to the large-diameter main portion of the contact arm.

It will be appreciated that motor 22 is energized when motor lead 33 is connected to ground. In this case the motor is energized through a circuit from ground through transformer secondary winding 32 and the motor and back to ground through motor lead 33. If the ground connection to motor lead 33 is interrupted, the motor is deenergized and stops rotating.

When switches 35 and 50 have the positions of Fig. 2, the motor 22 is energized since motor lead 33 is grounded through contact arm 44, lead 62, contact arm 53, lead 67 to contact 12 on the front portion 36 and the same contact on the rear section 37 which is grounded through contact arm 45. Hence the motor will rotate tuner 21 and switch shaft 43 in a clockwise direction. As the switch shaft rotates through one switch position, lead 33 is still grounded through contact arm 44, lead 63, contact arm 53, lead 67 and to ground through contact arm 45. In the next position of switch 35, lead 33 is grounded through contact arm 44, lead 63 and so on as before. However, as contact 4 on front portion 36 of wafer switch 35 on the next position of the switch becomes electrically insulated, the ground connection is interrupted. This is so because contact arm 44 makes contact with lead 65 connected to contact 8 on front switch portion 51 which is insulated from contact arm 53. Furthermore, contact arm 44 is electrically connected to lead 64 which again cannot make contact with contact arm 51.

It can be shown that every time contact arm 44 has a position such that its two projections straddle a particular contact on front section 36 which is the same contact with which the small projection of contact arm 53 makes connection on the front portion 51, the motor circuit is interrupted. On the other hand, if the two switches 35 and 50 have any different position, the motor is energized and continues rotating until a position is reached where the two wafer switches are again in similar positions. The control system of Fig. 2 otherwise operates in the same manner as does that of Fig. 1 so that further explanation is not necessary.

The number of positions which may be controlled from a remote point is not limited to twelve. By way of example, Fig. 3 illustrates a control system where sixteen different positions may be obtained. It is further to be understood that switches having a larger number of circumferentially spaced contacts may be used. Moreover, the control system of the invention may be used to obtain a remote indication of the position of an instrument or the like, instead of controlling remotely the position of the tuner of a television receiver. Such an arrangement has also been illustrated in Fig. 3 to which reference is now made.

The motor 22 is energized through voltage source 24 and the normally closed contact 26 of the relay 27. The relay winding is energized through the secondary winding 32 of the transformer 31. The transformer primary is energized through a voltage source 24′, which may be identical with voltage source 24, and main switch 25. Since the secondary winding 32 has one terminal grounded, the relay winding is energized to atract its contact 26 when the relay lead 33 is grounded.

This is accomplished through a pair of wafer switches 70 and 71, each consisting of a front portion 72, 73 and a rear portion 74, 75, respectively. Each of the wafer switches has sixteen positions and each front and rear portion also is provided with sixteen contacts marked by appropriate numbers. The odd contacts of each front portion such as 72 are connected to their corresponding contacts on the associated rear portion such as 74. Furthermore the odd contacts of front portions 72 and 73 are interconnected by leads 80, 81, 82, 83, 84, 85, 86, and 87 beginning with the contacts 1 and so on.

The front contact 72 of wafer switch 70 is provided with a contact arm 88 which extends over two of the contacts such as contacts 4 and 5 as shown. The contact arm 88 is secured to a switch shaft 90 which in turn is connected to motor 22 as indicated by dotted line 91. Another contact arm 92 is secured to wafer shaft 90 and cooperates with the contacts on the rear portion 74. Contact arm 92 also extends over two of the contacts, such as contacts 1 and 2. It will be noted that the two contact arms 88 and 92 are so disposed that one intermediate contact such as contact 3 is not in contact with any of the two arms.

A contact arm 93 cooperates with the contacts on front portion 73 and has two projections, each engaging two adjacent contacts with an intermediate contact insulated from the contact arm. Thus contact arm 93 may touch contacts 1, 2, 4 and 5 but not contact 3. Contact arm 93 is secured to a switch shaft 94 which may be controlled, for example by an instrument 95. The rear portion 74 of wafer switch 71 does not require a contact arm and hence may be omitted. Switch shaft 90 is connected to indicator 96 to indicate at a remote point the position of instrument 95.

It will be observed that in the position of wafer switches 70 and 71 shown in Fig. 3 the relay 27 is energized to open switch 26. Consequently, motor 22 is de-energized and further rotation of switch 70 has stopped. The circuit through the winding of relay 27 may be traced from ground through the secondary winding 32 of transformer 31, the relay winding, relay lead 33 connected to contact arm 88, lead 82, to contact 5 on front portion 73, contact arm 93, lead 80, to contacts 1 on the front and rear portions 72, 74, contact arm 92 and hence to ground.

Assuming now that the instrument 95 or other control device rotates switch shaft 94 into an adjacent position where contact arm 93 connects with contacts 2, 3, 5 and 6. Now the ground return for relay 27 will be broken, because lead 80 no longer is in contact with contact arm 93. Instead a connection may be traced from relay lead 33 to contact arm 88, lead 82, contact arm 93, lead 81 which cannot be traced back to ground. However, when the motor 22 which has now been energized, rotates switch 70 into its next position, grounded contact arm 92 will be connected to lead 81 through contacts 3 on the switch sections.

From the above explanations it will be obvious that when instrument 95 moves the wafer switch 71 into any other position, the motor 22 will be energized by closing of the relay contact 26 until the two switches have again reached similar positions whereby indicator 96 will exhibit the position of the instrument.

It will be understood that the remote control systems of Figs. 1 and 2 may be used in the manner of that of Fig. 3 to provide a remote indication of the position of an instrument. On the other hand, it is feasible to utilize the control circuit of Fig. 3 and the sixteen-position wafer switches in the control systems of Figs. 1 and 2.

There has thus been disclosed a remote control system which requires two wafer switches and a number of wires equal to one half the number of wafer positions. The remote control system of the invention may be used for remotely indicating the position of an instrument or for the remote control of a tuner of a television or other broadcast receiver set. The electric motor may either be directly controlled by the switches or by an auxiliary relay in case the voltage required by the motor should be higher than that which can safely be controlled by the wafer switches.

What is claimed is:

1. A control system for positioning a remote device in accordance with the position of a control device, said system comprising an electric motor coupled to said remote device for rotating it to a desired position, a source of electric energy for said motor, first switch means directly connected to said control device and having a predetermined number of contacts equal to the number of positions of said control device, second switch means coupled to said remote device and to said motor and adapted to be rotated by said motor, said second switch means having a number of contacts equal to that of said first switch means, conductors connecting corresponding alternate contacts on said first and second switch means, said first and second switch means having each at least one contact arm rotatable with respect to their associated contacts, each being arranged to make electrical contact with at least two adjacent ones of their associated contacts, and circuit means interconnecting said source of energy with said motor and the contact arm on said second switch means in such a manner as to energize said motor to rotate said remote device in response to rotation of said first switch means until both of said switch means are returned to like positions.

2. A control system as defined in claim 1 wherein said control device is an instrument and said remote device is an indicator for indicating the position of said instrument.

3. A control system as defined in claim 1 wherein said control device is manually operated and said remote device includes a tuner for a broadcast receiver, whereby said tuner may be controlled by said manually operated control device.

4. A control system for positioning a remote device to be controlled in accordance with the position of a control device, said system comprising an electric motor mechanically connected to said remote device for rotating it to a desired position, a source of electric energy for said motor, relay means including contact means, said contact means being connected with said source and said motor for energizing said motor when said contact means is closed, first switch means directly connected to said control device and having a predetermined number of contacts equal to the number of positions of said control device, second switch means coupled to said remote device and to said motor and adapted to be rotated by said motor, said second switch means having a number of contacts equal to that of said first switch means, conductors connecting corresponding alternate contacts on said first and second switch means, said first and second switch means having each at least one contact arm rotatable with respect to their associated contacts, each being arranged to make electrical contact with at least two adjacent ones of their associated contacts, and circuit means interconnecting said source with said relay means and the contact arm on said second switch means in such a manner as to energize said motor to rotate said remote device in response to rotation of said first switch means until both of said switch means are returned to like positions.

5. A control system for positioning a remote device to be controlled in accordance with the position of a control device, said system comprising an electric motor mechanically connected to said remote device for rotating it to a desired position, a source of electric energy for said motor, a relay including normally closed contact means, said contact means being connected in series with said source and said motor for energizing said motor when said contact means is closed, first switch means directly connected to said control device and having a predetermined number of contacts equal to the number of positions of said control device, second switch means coupled to said remote device and to said motor and adapted to be rotated by said motor, said second switch means having a number of contacts equal to that of said first switch means, conductors connecting corresponding alternate contacts on said first and second switch means, said first and second switch means having each at least one contact arm rotatable with respect to their associated contacts, each being arranged to make electrical contact with at least two adjacent ones of their associated contacts, and circuit means interconnecting said source with said relay and the contact arm on said second switch means in such a manner as to de-energize said relay, thereby to energize said motor to rotate said remote device in response to rotation of said first switch means until both of said switch means are returned to like positions whereupon said relay is energized.

6. A control system as defined in claim 1 wherein said circuit means directly connects said source of energy with said motor and the contact arm on said second switch means, whereby said motor is de-energized in response to both of said switch means being in like positions.

7. A control system for positioning a remote device to be controlled in accordance with the position of a control device, said system comprising an electric motor mechanically coupled to said remote device for rotating it to a desired position, a source of electric energy for said motor, first switch means mechanically connected to said control device and having twelve contacts, second switch means mechanically connected to said remote device and adapted to be rotated by said motor, said second switch means having twelve contacts, conductors connecting corresponding alternate contacts on said first and second switch means, said first switch means having a first contact arm rotatable with respect to its associated contacts, said second switch means having a second and a third contact arm rotatable in unison with respect to its associated contacts, each of said contact arms being arranged to make electrical contact with at least two adjacent ones of its associated contacts, and circuit means interconnecting said source of energy with said motor and said second and third contact arms in such a manner as to energize said motor to rotate said remote device in response to rotation of said first switch means until both of said switch means have like positions.

8. A control system as defined in claim 7 wherein said circuit means includes a relay having a normally closed contact connecting said motor to said source, said relay having one terminal connected to said second contact arm, the other terminal of said relay being serially connected to said source and said third contact arm, whereby energization of said relay will de-energize said motor, said first contact arm being shaped to make electrical contact with two adjacent pairs of contacts separated by an intermediate contact, said second contact arm being insulated from said third contact arm and being shaped to make electrical contact with a first pair of contacts, and said third contact arm being shaped to make electrical contact with a second pair of contacts, said first and second pair of contacts on said second switch means being separated by an intermediate contact.

9. A control system as defined in claim 7 wrerein said circuit means connects directly said motor to said source, one terminal of said motor being connected to said second contact arm, one terminal of said source being connected to said third contact arm, said first contact arm being shaped to make electrical contact with a first contact on said first switch means, two contacts on either side of said first contact being not connected to said first contact arm, and the remaining seven contacts being in electrical contact with said first contact arm, said second contact arm being shaped to make electrical contact with two pairs of contacts separated by an intermediate contact, and said third contact arm being insulated from said second contact arm and being shaped to make electrical contact with seven adjacent contacts disposed adjacent said two pairs of contacts.

10. A control system for positioning a remote device to be controlled in accordance with the position of a control device, said system comprising an electric motor mechanically coupled to said remote device for rotating it to a desired position, a source of electric energy for said motor, first switch means mechanically connected to said control device and having sixteen contacts, second switch means mechanically connected to said remote device and adapted to be rotated by said motor, said second switch means having sixteen contacts, conductors connecting corresponding alternate contacts on said first and second switch means, said first switch means having a first contact arm rotatable with respect to its associated contacts, said second switch means having a second and a third contact arm rotatable in unison with respect to its associated contacts, each of said contact arms being arranged to make electrical contact with at least two adjacent ones of its associated contacts, and circuit means interconnecting said source of energy with said motor and said second and third contact arms in such a manner as to energize said motor to rotate said remote device in response to rotation of said first switch means until both of said switch means have like positions.

11. A control system as defined in claim 10 wherein said circuit means includes a relay having a normally closed contact connecting said motor to said source, said relay having one terminal connected to said second contact arm, the other terminal of said relay being connected in series to said source and said third contact arm, whereby energization of said relay will de-energize said motor, said first contact arm being shaped to make electrical contact with two adjacent pairs of contacts separated by an intermediate contact, said second contact arm being insulated from said third contact arm and being shaped to make electrical contact with a first pair of contacts, and said third contact arm being shaped to make electrical contact with a second pair of contacts, said first and second pair of contacts on said second switch means being separated by an intermediate contact.

References Cited in the file of this patent

UNITED STATES PATENTS

| | | |
|---|---|---|
| 2,553,069 | Unk et al. | May 15, 1951 |
| 2,617,313 | Schweighofer et al. | Nov. 11, 1952 |